US 8,196,349 B2

(12) United States Patent
Golub et al.

(10) Patent No.: US 8,196,349 B2
(45) Date of Patent: Jun. 12, 2012

(54) LIFTING WINDOW

(75) Inventors: Silvester Golub, Brackenheim (DE); Andreas Waser, Affalterbach (DE)

(73) Assignee: Richard Fritz GmbH + Co. KG, Besigheim (DE)

( * ) Notice: Subject to any disclaimer, the term of this patent is extended or adjusted under 35 U.S.C. 154(b) by 765 days.

(21) Appl. No.: 12/298,228

(22) PCT Filed: Apr. 20, 2007

(86) PCT No.: PCT/EP2007/003459
§ 371 (c)(1),
(2), (4) Date: Oct. 23, 2008

(87) PCT Pub. No.: WO2007/124874
PCT Pub. Date: Nov. 8, 2007

(65) Prior Publication Data
US 2009/0199483 A1    Aug. 13, 2009

(30) Foreign Application Priority Data

Apr. 29, 2006 (DE) .......................... 10 2006 020 108

(51) Int. Cl.
*E05F 11/38* (2006.01)
(52) U.S. Cl. ............................................. 49/349; 49/208
(58) Field of Classification Search .................. 49/208, 49/209, 216, 221, 225, 348, 349, 502
See application file for complete search history.

(56) References Cited

U.S. PATENT DOCUMENTS

| 4,586,290 | A | * | 5/1986 | Juechter | 49/348 |
| 4,747,232 | A | * | 5/1988 | Stephenson et al. | 49/452 |
| 4,766,697 | A | * | 8/1988 | Boileau | 49/352 |
| 4,848,032 | A | * | 7/1989 | Ballor et al. | 49/350 |
| 4,935,986 | A | | 6/1990 | Church et al. | |
| 5,009,461 | A | * | 4/1991 | Smith-Horn et al. | 296/146.2 |
| 5,081,792 | A | * | 1/1992 | Huebner | 49/221 |
| 5,307,539 | A | * | 5/1994 | Bauman | 16/239 |
| 5,622,005 | A | * | 4/1997 | Ochenski et al. | 49/375 |
| 5,794,310 | A | * | 8/1998 | Dallmann | 16/362 |
| 5,964,011 | A | * | 10/1999 | Ruston et al. | 16/239 |
| 6,152,636 | A | * | 11/2000 | Nass | 403/13 |
| 6,598,345 | B1 | * | 7/2003 | Arimoto et al. | 49/374 |
| 2002/0184825 | A1 | * | 12/2002 | Ayran | 49/348 |

FOREIGN PATENT DOCUMENTS

| DE | 28 43 634 A1 | 4/1980 |
| GB | 1 447 576 | 8/1976 |
| GB | 2 262 957 A | 7/1993 |

* cited by examiner

*Primary Examiner* — Katherine W Mitchell
*Assistant Examiner* — Justin Rephann
(74) *Attorney, Agent, or Firm* — Renner, Otto, Boisselle & Sklar, LLP

(57) ABSTRACT

The lifting window (15) has a windowpane (17) which can be raised and lowered by means of a lifting device and which is guided here by two guide rails (24; 25). In the region of at least one side edge (19), the windowpane (17) is guided, at a point remote from the lifting device, only indirectly by the associated guide rail (24) by means of an adjusting device (38). The adjusting device (38) has a guide strip (39) which interacts with the associated guide rail (24). The guide strip (39) is guided by means of a guide device (41) so as to be moveable at least approximately perpendicularly to the windowpane (17). Said guide strip (39) can be adjusted relative to the windowpane (17) by means of an adjustment device (42) and can be fixed in the desired relative position by means of a fixing device.

8 Claims, 4 Drawing Sheets

LIFTING WINDOW

It is usual in motor vehicles to configure the window in the vehicle doors as a lifting window, so that said window may be closed or opened. To this end, in the cavity of the door two guide rails are present which are connected to structural parts of the door. These guide rails have two guide webs which have a specific uniform clearance, which is adapted to the thickness of the edge region of the window pane. The two guide rails and the guide webs thereof are adapted, in the direction of the movement path of the window pane, to the shape and to the movement path thereof, so that during the lifting movement the window pane does not jam in the guide rails.

During assembly of the motor vehicle, the doors are aligned relative to the bodywork, so that the outer face of the doors is aligned with the adjoining surfaces of the bodywork. This alignment takes place, on the one hand, at the hinges of the doors and, on the other hand, at the door lock. In a door aligned in this manner, it may result that the window pane of the lifting window is not aligned with the adjoining bodywork parts or even with a further window pane immediately adjacent thereto. Apart from impairing the appearance of the motor vehicle, this misalignment may also lead to unpleasant wind noise when the motor vehicle is traveling, and namely in particular when, with the lifting window positioned to the front in the direction of travel, the window pane is retracted inwards relative to the window pane adjacent to the rear, or expressed in reverse, when the window pane adjacent to the rear, projects beyond the line of alignment of the window pane arranged in front.

These disadvantageous effects may also occur when the window panes adjacent to one another are offset relative to one another in their vertical extension. This may occur due to the manufacturing tolerances of the parts and/or even due to the unavoidable tolerances when mounting the guide rails in the door, so they deviate from the desired value relative to the outside of the door.

The object of the invention is to design a lifting window such that the window pane thereof may be adjusted in a manner which is as simple as possible to the adjacent parts of the bodywork and/or an immediately adjacent window pane.

This object is achieved by a lifting window comprising the features provided in claim 1.

As the window pane is provided in the region of at least one side edge with a guide strip, which is arranged at a position remote from the lower window pane edge and which is adapted to the associated guide rail and thus may cooperate with the associated guide rail instead of the edge region of the side edge of the window pane, and as this guide strip is connected to the window pane by an adjusting device, the distance of the guide strip from the window pane may be adjusted. As a result, the window pane of the lifting window may be adjusted to its desired position and to its desired movement relative to the adjacent parts, even when its guide rail deviates from its desired position.

Advantages embodiments of the lifting window are provided in the sub-claims, which in a simple manner contribute to moving the window pane of the lifting window to the desired setting relative to the adjacent parts of the bodywork.

The invention is described in more detail hereinafter with reference to embodiments which are shown in the drawings, in which.

Figure 1:
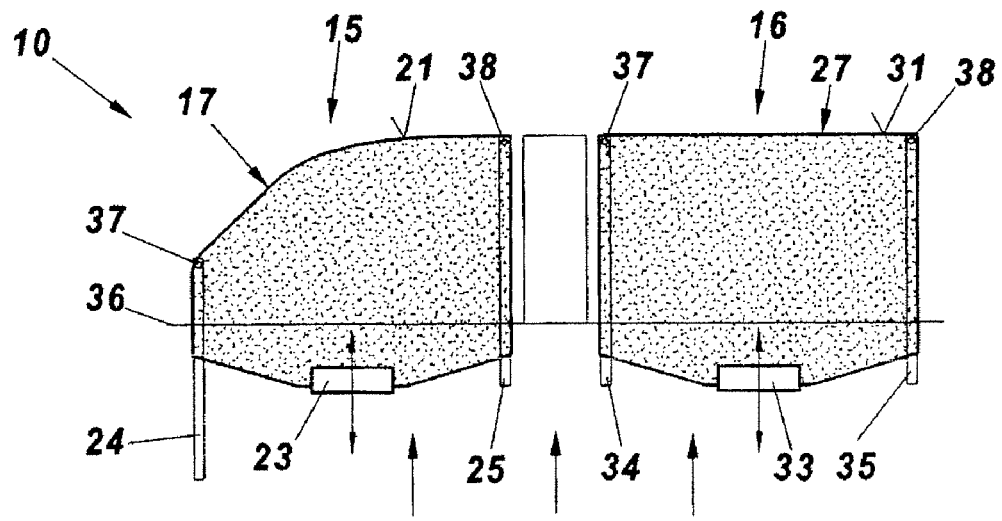
FIG. 1 shows a detailed schematic side view of a motor vehicle comprising two doors with the lifting window in the raised state.
Figure 2:
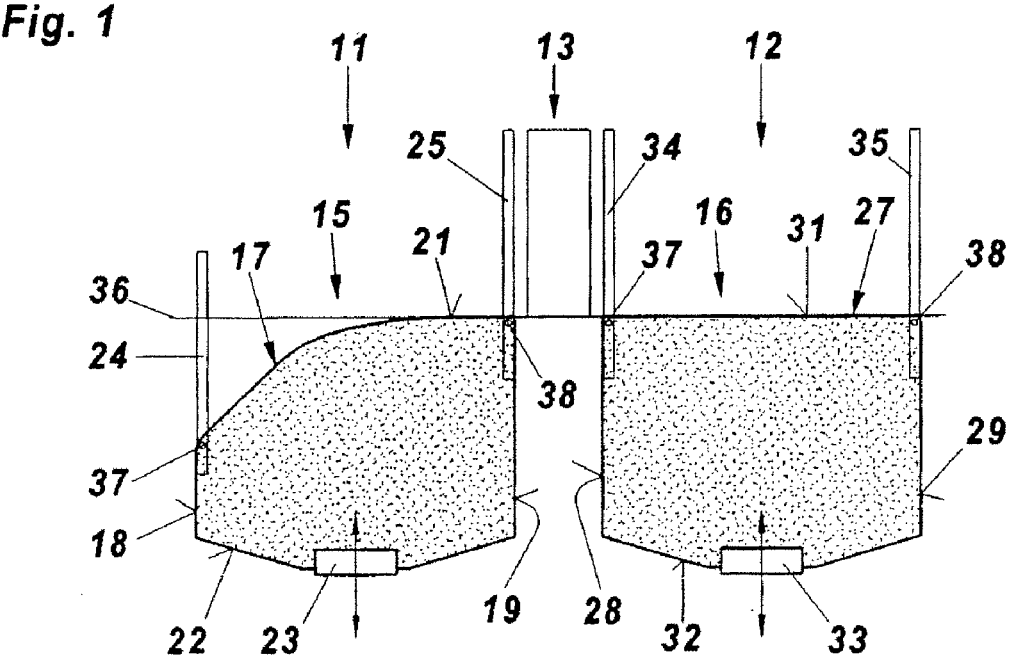
FIG. 2 shows a side view as in FIG. 1 with the lifting window in the lowered state.
Figure 3:
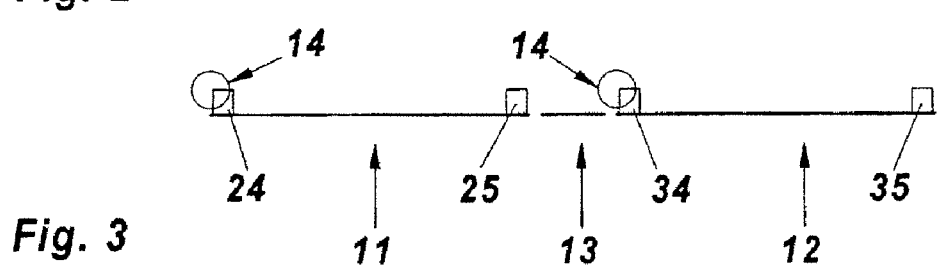
FIG. 3 shows a detailed schematic plan view of the side of a motor vehicle comprising two doors.

In FIG. 1 and FIG. 2 the side region of a motor vehicle 10 may be seen with two doors, the front door 11 and the rear door 12, and a bodywork part, the B-pillar, arranged therebetween. In FIG. 3, these parts may be seen from above, the hinges 14 of the front door 11 and the rear door 12 also being visible.

As may also be seen from FIG. 1 and FIG. 2, the front door 11 has a lifting window 15 and the rear door 12 has a lifting window 16. The front lifting window 15 has a window pane 17, the two side edges 18 and 19 thereof which extend in the direction of movement of the window pane being aligned parallel to one another (FIG. 2). The upper edge 21 of the window pane 17 extends in a partially straight and partially curved manner and extends at least approximately parallel to the inner edge of the window aperture of the front door 11. The lower edge 22 of the window pane 17 has in its center a portion extending in a straight and horizontal manner and, to the side, portions adjacent thereto extending slightly obliquely. On the central portion of the lower edge 22, a lifting plate 23 is arranged which is fixedly connected to the window pane 17. This lifting plate 23 is part of a lifting device, not shown further, by means of which the window pane 17 may be moved into the raised position shown in FIG. 1 and into the lowered position shown in FIG. 2. The lifting window 15 has, moreover, two guide rails 24 and 25, which guide the window pane 17 during its lifting movement.

In a similar manner, the rear lifting window 16 has a window pane 27, the two side edges 28 and 29 thereof which extend in the direction of movement of the window pane being aligned parallel to one another (FIG. 2). The upper edge 31 of the window pane 27 extends in a straight manner and at least approximately parallel to the inner edge of the window aperture of the rear door 21. The lower edge 32 of the window pane 27 has in its center a portion extending in a straight and horizontal manner and, to the side, portions adjacent thereto extending slightly obliquely. On the central portion of the lower edge 32, a lifting plate 33 is arranged which is fixedly connected to the window pane 27. This lifting plate 33 is part of a lifting device, not shown further, by means of which the window pane 27 may be moved into the raised position shown in FIG. 1 and into the lowered position shown in FIG. 2. The lifting window 16 has, moreover, two guide rails 34 and 35, which guide the window pane 27 during its lifting movement.

As is visible primarily from FIG. 2, each of the two window panes 17 and 27 may be lowered to such an extent that their upper edges 21 and/or 31 are located level with the lower edge of the window aperture of the front door 11 or the rear door 12 and thus level with the so-called channel edge 36 of the doors.

In FIG. 1 and FIG. 2 adjusting devices 37 and 38 are indicated, both on the front lifting window 15 and on the rear lifting window 16, of which the adjusting device 37 is positioned in the vicinity of the transition point from the upper window pane edge 21 and/or 31 to the left-hand side edge 18 and/or 28 and of which the other adjusting device 38 is located in the vicinity of the transition point from the upper window pane edge 21 and/or 31 to the right-hand side edge 19 and/or 29. Depending on the characteristics of the motor vehicle, it may be sufficient simply to attach an adjusting device to one side edge, in particular to the rear side edge 19 and 29 or even simply to one window pane, in particular to the window pane 17 of the lifting window 15 of the front door 11 and to guide the window panes directly in the associated guide rail on the remaining side edges in the conventional manner.

Figure 4:
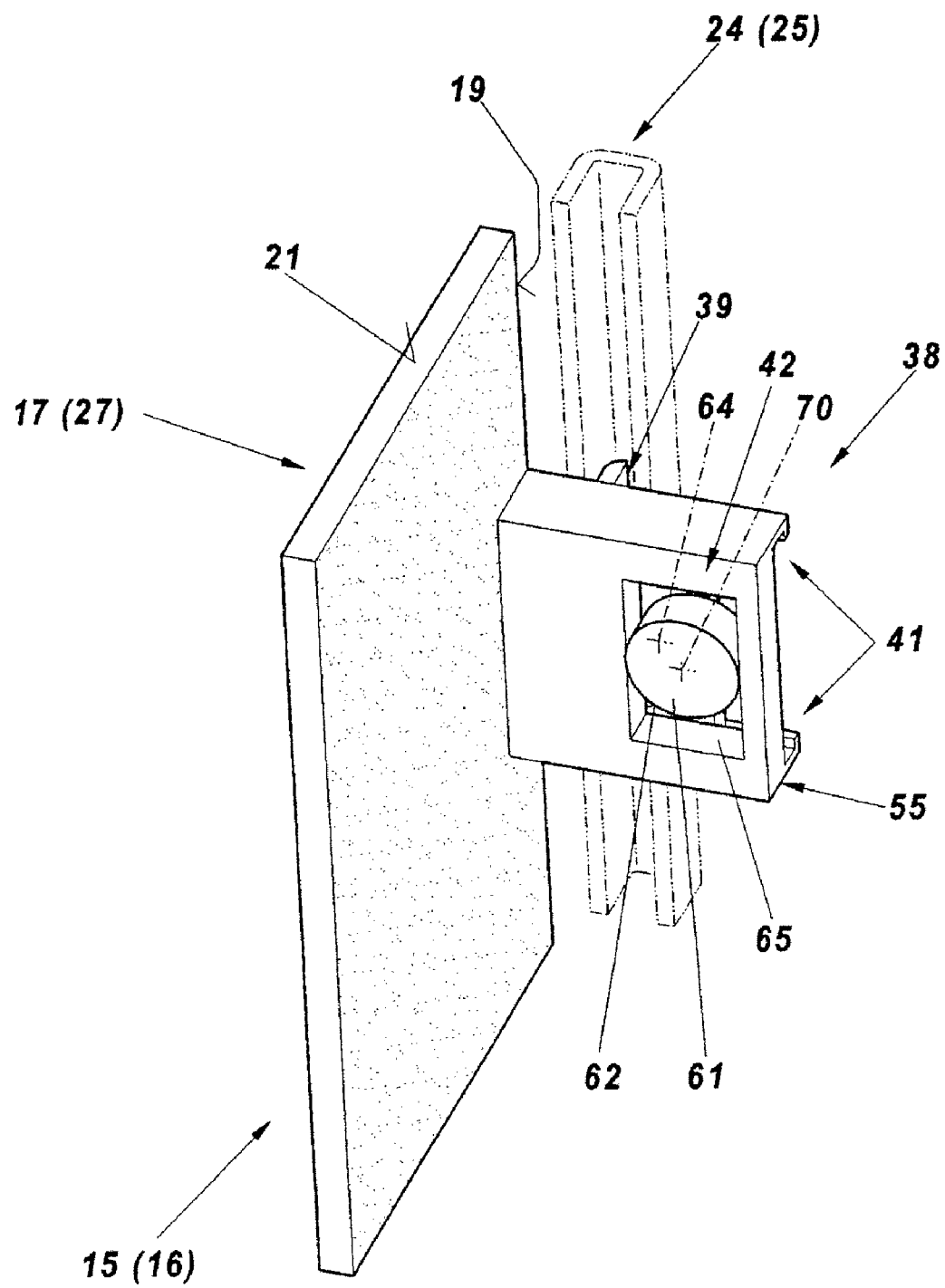
FIG. 4 shows the guide rail.
Figure 8:
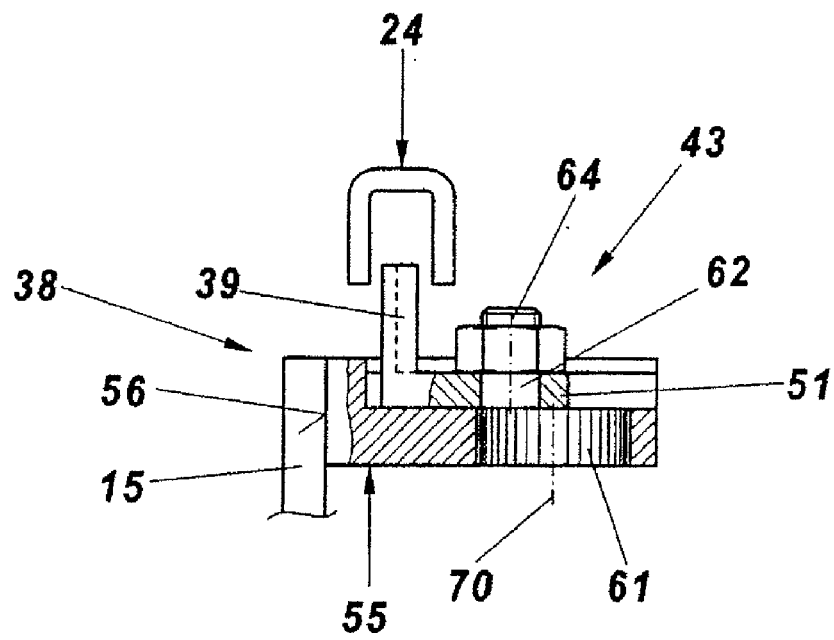
FIG. 8 shows a partially sectioned plan view of the adjusting device with the associated guide rail.

Each of the adjusting devices 37 and 38 has a guide strip 39 which cooperates with the associated guide rail 24 and/or 25 instead of the edge region of the associated window pane 17 and/or 27, as is shown by way of example in FIG. 4 and FIG. 8.

The two adjusting devices 37 and 38 for one of the window panes 17 or 27 are of the same configuration and mounted mirror symmetrically only with regard to their use on the left-hand side edge and on the right-hand side edge of the window pane. Hereinafter, therefore, only the adjusting device 38 (FIG. 4) is described in detail.

Figure 5:
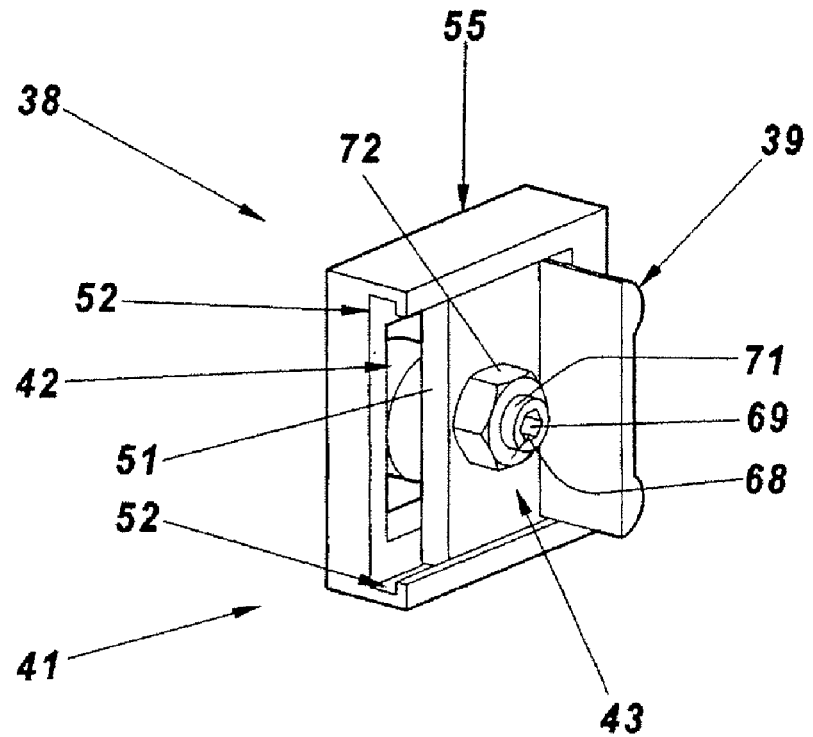
FIG. 5 shows a three-dimensional view of the adjusting device from a different viewing direction.

The adjusting device 38 combines a guide device 41 (FIG. 4 and FIG. 5), an adjustment device 42 (FIG. 4 and FIG. 5) and a fixing device 43 (FIG. 5).

By means of the guide device 41, the guide strip 39 is movably guided at least approximately perpendicular to the window pane 15. By means of the adjustment device 42, the guide strip 39 may be adjusted to the desired distance from the window pane 17. By means of the fixing device 43 the guide strip 39 is fixed at a set distance.

Figure 7:
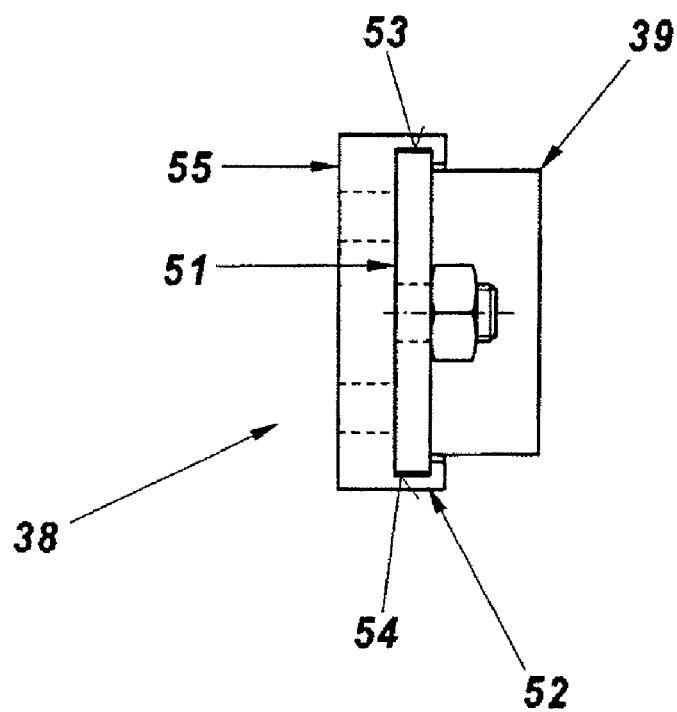
FIG. 7 shows a front view of the adjusting device.

The guide device 41 is formed by a guide carriage 51 and by a carriage guide 52 adapted thereto (FIG. 7). The guide carriage 51 is of plate-shaped configuration and has two parallel edges 53 and 54. The guide strip 39 is fixedly connected to the guide carriage 51 (FIG. 5). The carriage guide 52 is formed by a part of C-shaped configuration of a base body 55 which is substantially cuboid externally. The carriage guide 52 partially encompasses with its C-profile the guide carriage 51 (FIG. 5 and FIG. 7).

The base body 55 has on the front face facing the window pane 15 a bearing surface 56, the shape thereof being adapted to the shape of the window pane 15 (FIG. 8). The base body 55 bears with its bearing surface 56 against the window pane 15 and is permanently connected thereto.

The adjustment device 42 has an adjustment body 61 which is of disk-shaped configuration (FIG. 4). The adjustment body 61 is fixedly connected to a cylindrical shaft 62. The shaft 62 is rotatably mounted in a cylindrical through-hole of the guide carriage 51 (FIG. 8). The distance of the peripheral surface 63 of the adjustment body 61 from the axis 64 of the shaft 62 is altered. This means that the adjustment body 61 is configured as a cam disk or as an eccentric disk.

The adjustment device 42, moreover, has a slot 65 for the adjustment body 61 (FIG. 4). The slot 65 is formed by a recess in the wall of the base body 55, which is positioned in the region against which the guide carriage 51 bears and slides along. For the sake of simplicity this recess is shown as a through-opening of a wall which is open on both sides. According to the production method of the base body 55, this recess may also be designed as a recess of the wall of the base body 55, the rear wall thereof being closed.

Figure 6:
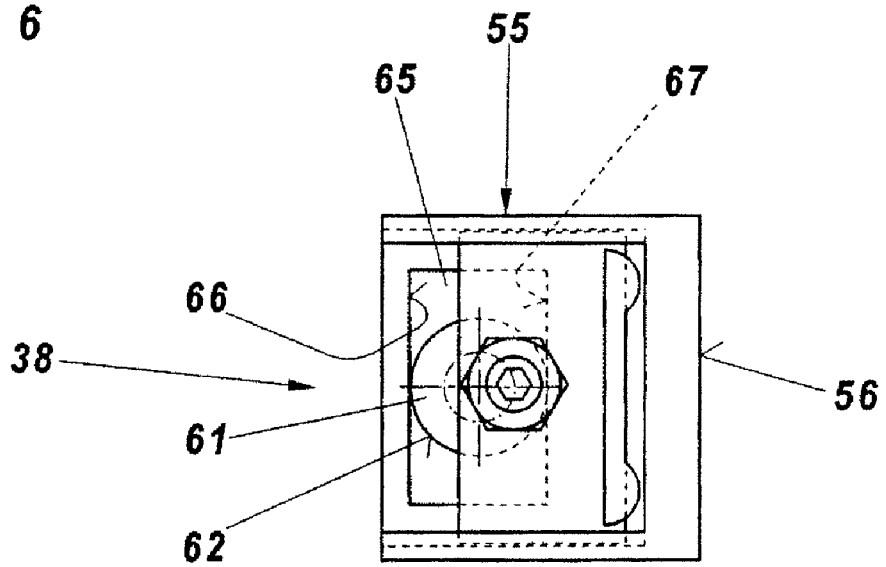
FIG. 6 shows a side view of the adjusting device.

The slot 65 has two wall surfaces 66 and 67 aligned at least approximately parallel to the bearing surface 56 of the base body 55, the clearance thereof being adapted to the dimensions of the adjustment body 61 (FIG. 6). This applies above all to a design of the base body 55 as an eccentric disk with a circular cylindrical peripheral surface 63 having the cylinder axis 70.

The shaft 62 of the adjustment body 61 is provided at its end remote from the adjustment body 61 with actuating surfaces 68 for the use of a tool. Said shaft is formed by the surfaces of a hexagon socket (FIG. 5) which form part of a central recess 69 of the shaft 62.

The fixing device 43 is, amongst others, formed by a longitudinal portion 71 of the shaft 62, which projects from the through-hole of the guide carriage 51 (FIG. 5) and which is provided with an external thread.

As a further part of the fixing device 43, a nut 72 is used which is adapted to the external thread of the longitudinal portion 71 and is screwed thereto.

For adjusting the guide strip 39 relative to the window pane 17, and thus relative to the base body 55 of the adjusting device 38 connected thereto, the nut 72 is loosened on the fixing device 43. Via the actuating surfaces 68, by means of a tool adapted thereto, the shaft 62 and the adjustment body 61 connected thereto are rotated in either rotational direction. As the adjustment body 61 is guided in the slot 65 by its two wall surfaces 66 and 67, the position of the axis 64 of the shaft 62 alters in the lateral direction, i.e. toward or away from the window pane 17. This lateral displacement is transferred to the guide carriage 51 so that the relative position of the guide strip 39 to the window pane 17 is altered. When the desired adjustment has been reached, the nut 72 is again tightened, the shaft 62 being prevented from rotating via the actuating surfaces 68 by means of a tool. Subsequently, the adjustment device 42 is fixed in the new position.

Metals and non-metals are considered as material for the parts of the adjusting device 37 and 38. In a metal design, a sufficient corrosion resistance of the parts has to be considered. It is more expedient to produce the parts from plastics of sufficient strength, for example from polyamide, and namely in an injection-molding process. Thus, additional measures for the corrosion resistance are dispensed with.

As is visible from FIG. 5 and FIG. 6, the guide strip 39 has a contour which is similar to that of a dumb-bell, the one side being of flat configuration. On the other side, two rounded beads are present. They simplify the sliding movement of the guide strip 39 in the associated guide rail 24. Said guide rail is shown in FIG. 4 and FIG. 8 for the sake of clarity, with a greater inside width than in reality. The inner face of its side cheeks may be respectively covered with a bead in order to simplify the sliding movement of the guide strip 39.

LIST OF REFERENCE NUMERALS

10 Motor vehicle
11 Front door
12 Rear door
13 B-pillar
14 Hinge
15 Lifting window
16 Lifting window
17 Window pane
18 Side edge
19 Side edge
21 Upper edge
22 Lower edge
23 Lifting plate
24 Guide rail
25 Guide rail
27 Window pane
28 Side edge
29 Side edge
31 Upper edge
32 Lower edge
33 Lifting plate
34 Guide rail
35 Guide rail 36 Channel edge
37 Adjusting device
38 Adjusting device
39 Guide strip
41 Guide device
42 Adjustment device
43 Fixing device
51 Guide carriage
52 Carriage guide
53 Edge
54 Edge
55 Base body
56 Bearing surface
61 Adjustment body
62 Shaft
63 Peripheral surface
64 Axis
65 Slot
66 Wall surface
67 Wall surface
68 Actuating surfaces
69 Recess
70 Cylinder axis
71 Longitudinal portion
72 Nut

The invention claimed is:

1. A lifting window for a motor vehicle, comprising:
a window pane including a lower edge and two side edges;
two guide rails connected to a bodywork part of the motor vehicle, each of the two guide rails including at least two guide webs having a specific uniform clearance; and
a lifting device for moving the window pane,
wherein the two side edges are parallel to one another, extend in a direction of movement of the window pane and form guide edges of the window pane,
wherein one of the two guide rails is provided for each of the two side edges, each of the two guide rails has a movement path configured for moving the two side edges, each of the two side edges facing one of the two guide rails,
wherein the window pane further includes a guide strip in an edge region of at least one of the two side edges,
wherein the guide strip is remote from the lower edge, is configured to fit within one of the two guide rails and cooperates with the one of the two guide rails instead of the edge region,
wherein an adjusting device connects the guide strip to the window pane and is configured to adjust a distance of the guide strip from the window pane.

2. The lifting window as claimed in claim 1,
wherein the adjusting device includes:
a guide device configured to move the guide strip at least approximately perpendicular to the window pane,
an adjustment device configured to adjust the guide strip relative to the window pane in both directions for moving the window pane, and
a fixing device configured to fix the guide strip at a set distance from the window pane.

3. The lifting window as claimed in claim 2,
wherein the guide device is formed by a guide carriage and a carriage guide adapted to receive the guide carriage,
wherein the guide carriage comprises a plate-shaped configuration and includes two parallel edges,
wherein the carriage guide comprises a C-shaped configuration and at least partially encompasses the two parallel edges, and
wherein the guide strip is fixedly connected to the guide carriage.

4. The lifting window as claimed in claim 3,
wherein the carriage guide is one of arranged on a base body of the adjusting device and part of the base body,
wherein the base body includes a bearing surface aligned parallel to the window pane, and
wherein the bearing surface bears against the window pane and is permanently connected to the window pane.

5. The lifting window as claimed in claim 2,
wherein the adjustment device further includes an adjustment body of disc-shaped configuration fixedly connected to a cylindrical shaft and rotatably mounted in a cylindrical through-hole of a guide carriage,
wherein the adjustment body includes a peripheral surface comprising one of a cam surface and a circular eccentric surface for altering a distance from a shaft axis to the guide strip,
wherein the adjustment device further includes a slot formed by a recess on the base body and two wall surfaces aligned at least approximately parallel to the window pane, the clearance between the two wall surfaces adapted to the dimensions of the adjustment body, and
wherein at least one of the adjustment body and the shaft include actuating surfaces for the use of a tool.

6. The lifting window as claimed in claim 2,
wherein the fixing device is formed by a longitudinal portion of a shaft of an adjustment body which projects from a guide carriage and includes an external thread and by a nut which is secured to the external thread.

7. The lifting window as claimed in claim 5, wherein the slot for the adjustment body comprises one of an open through-hole of a wall of the base body and the recess of the wall of the base body with a closed rear wall.

8. The lifting window as claimed in claim 5, wherein the actuating surface comprises as one of a hexagon insert and a hexagon socket.

* * * * *